(No Model.)

W. JOHNSTON.
FORCE PUMP.

No. 284,859. Patented Sept. 11, 1883.

WITNESSES:
Theo. G. Hoster
C. Sedgwick

INVENTOR:
W. Johnston
BY Munn & Co.
ATTORNEYS.

UNITED STATES PATENT OFFICE.

WILLIAM JOHNSTON, OF ESSEX, IOWA.

FORCE-PUMP.

SPECIFICATION forming part of Letters Patent No. 284,859, dated September 11, 1883.

Application filed October 23, 1882. (No model.)

*To all whom it may concern:*

Be it known that I, WILLIAM JOHNSTON, of Essex, in the county of Page and State of Iowa, have invented a new and Improved Force-Pump, of which the following is a full, clear, and exact description.

The object of my invention is to provide a new and improved force-pump which requires but little space, and which can be operated by the tube through which the water rises.

Reference is to be had to the accompanying drawings, forming part of this specification, in which similar letters of reference indicate corresponding parts in both the figures.

Figure 1:
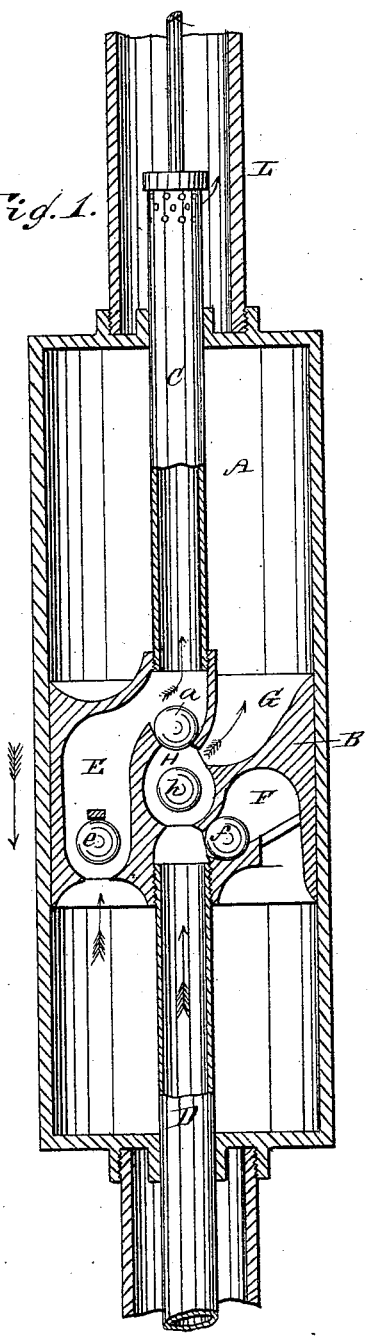
Figure 2:
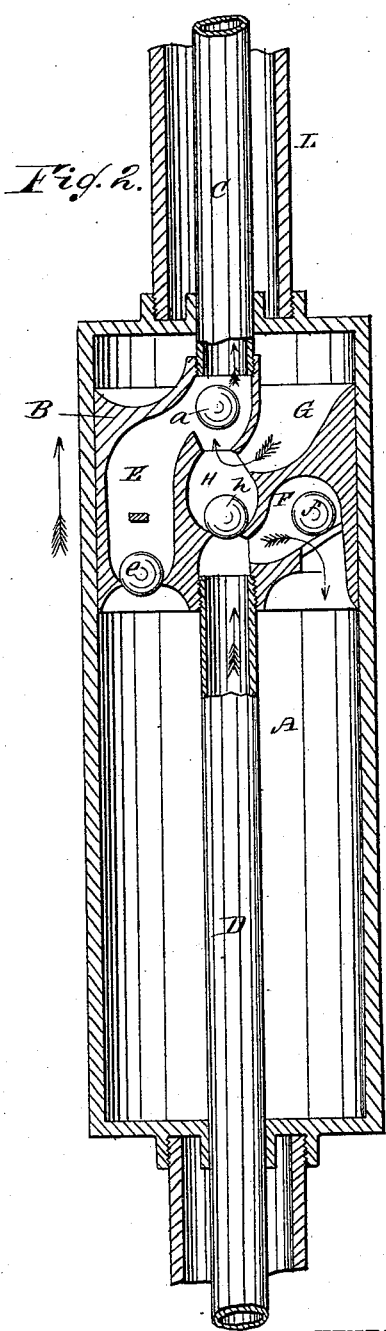

Figure 1 is a longitudinal sectional elevation of my improved pump, showing the piston partly lowered. Fig. 2 is a longitudinal sectional elevation of the same, showing the piston raised.

The cylinder A, which stands vertically, contains a piston, B, to the upper end of which a pipe, C, through which the water rises out of the cylinder, is attached, the said pipe passing through an aperture in the upper part of the cylinder, which aperture is of such size that the pipe C can move in the same, but no water can escape between the edges of the aperture and the pipe. The suction-pipe D is attached to the lower part of the piston B and passes through an aperture in the bottom of the cylinder, which aperture is also of such size that no water can escape between the edges of the same and the pipe D. The piston is provided with a channel, E, which establishes communication between the lower end of the pipe C and the lower part of the piston. On the other side it is provided with a channel, F, which establishes communication between the upper end of the pipe D and the bottom of the piston. It is also provided with a channel, G, which establishes communication between the top of the piston and the upper end of the pipe D. A connecting-channel, H, establishes communication between the ends of the pipes C and D. The channel E contains a valve, $e$, the channel F contains a valve, $f$, the channel H contains a valve, $h$, and above the channel H a valve, $a$, is provided, which can close the top of the channel H. The ball-valves are all provided with suitable baskets or stops, to prevent them from moving too far.

In the case shown the pipe C extends only a short distance above the cylinder A, and is then provided with a series of apertures, through which the water passes into a stand-pipe, L, through which it rises to the surface; but, if desired, the pipe C may be extended to the surface, and may be used for reciprocating the piston vertically. Thereby the great length of pipe L and a sucker-rod can be dispensed with, and thus the expense of the pump reduced considerably. When the piston B moves downward, the water contained in the lower part of the cylinder A moves the valve $e$ upward, and the water in the lower part of the cylinder passes up through the channel E into the pipe C, as it can escape nowhere else. The descending piston creates a vacuum (in the cylinder) above the piston, and the vacuum causes the water to rise in the pipe D, and this water raises the valve $h$, and passes through the channel G into that part of the cylinder above the piston, and the said water rests on the piston. While the piston descends, the valve $a$ closes the top of the channel H, and the valve $f$ closes the upper end of the channel F. When the piston ascends, as shown in Fig. 2, the valve $e$ closes the bottom port of the channel E, and the valve $h$ closes the lower end of the channel H. The valve $a$ is raised, and permits the water that is above the piston to pass in the direction of the arrow through the channel G into the pipe C. The water cannot pass to the bottom of the piston, as the valves $e$ and $h$ close all communication from above to below the piston. If the piston is raised, a vacuum is produced (in the cylinder) below the piston, and the water entering through the pipe D moves the valve $f$ to one side, so that the water can pass through the channel F from the pipe D into the lower part of the cylinder, and this water is then raised when the piston descends, and so on alternately. It is of great importance that the pipes C and D should be very closely packed where they pass through the ends of the cylinder.

Having thus described my invention, what I claim as new, and desire to secure by Letters Patent, is—

1. The combination, with the cylinder A and the suction-pipe D, of a piston, B, having a chamber, F, connecting at one end with the cylinder, at the other end with a subjacent space in the cylinder, and provided intermediately with the valve $f$, whereby the water is transferred from the suction-pipe to the space under the piston, as described.

2. The combination, with the cylinder A and suction-pipe D, of a piston having the chamber E, valved at $a$, the hollow stem C, the central chamber, H, valved at $h$, and the unvalved chamber G, open at its upper end, said chambers E G H communicating with each other and with the hollow piston-stem C, as shown and described.

3. In a pump, the combination, with a cylinder, A, of the piston B, provided with the channels E F G H, containing the valves $a$, $e$, $f$, and $h$, and of the pipes D and C, substantially as herein shown and described, and for the purpose set forth.

WILLIAM JOHNSTON.

Witnesses:
F. M. WILSON,
JOSEPH TAVERNER.